May 3, 1932. E. R. HERREN 1,856,635
MECHANICALLY OPERATED BRAKE
Filed June 19, 1930 2 Sheets-Sheet 1
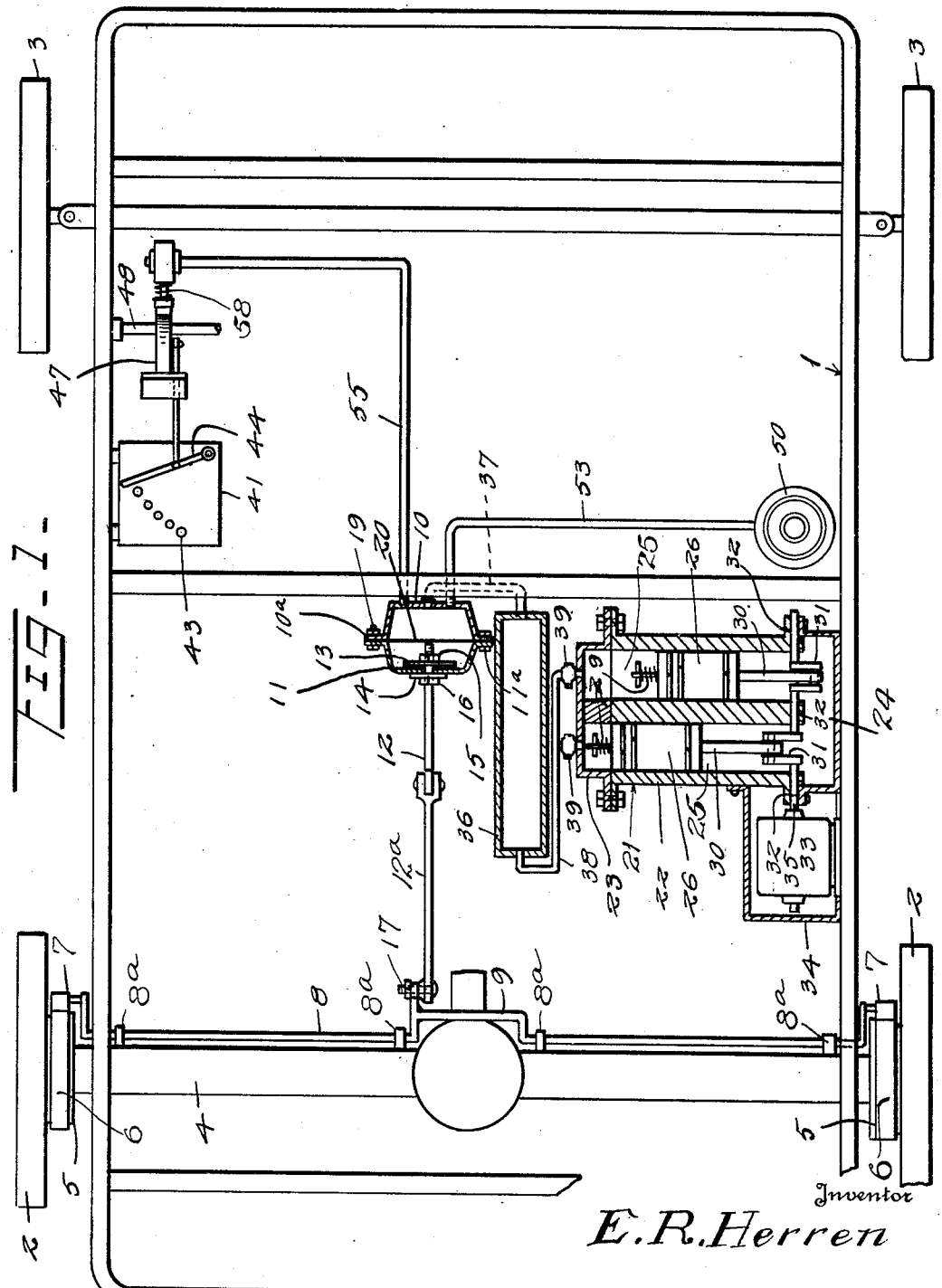
Inventor
E. R. Herren
By Watson E. Coleman
Attorney

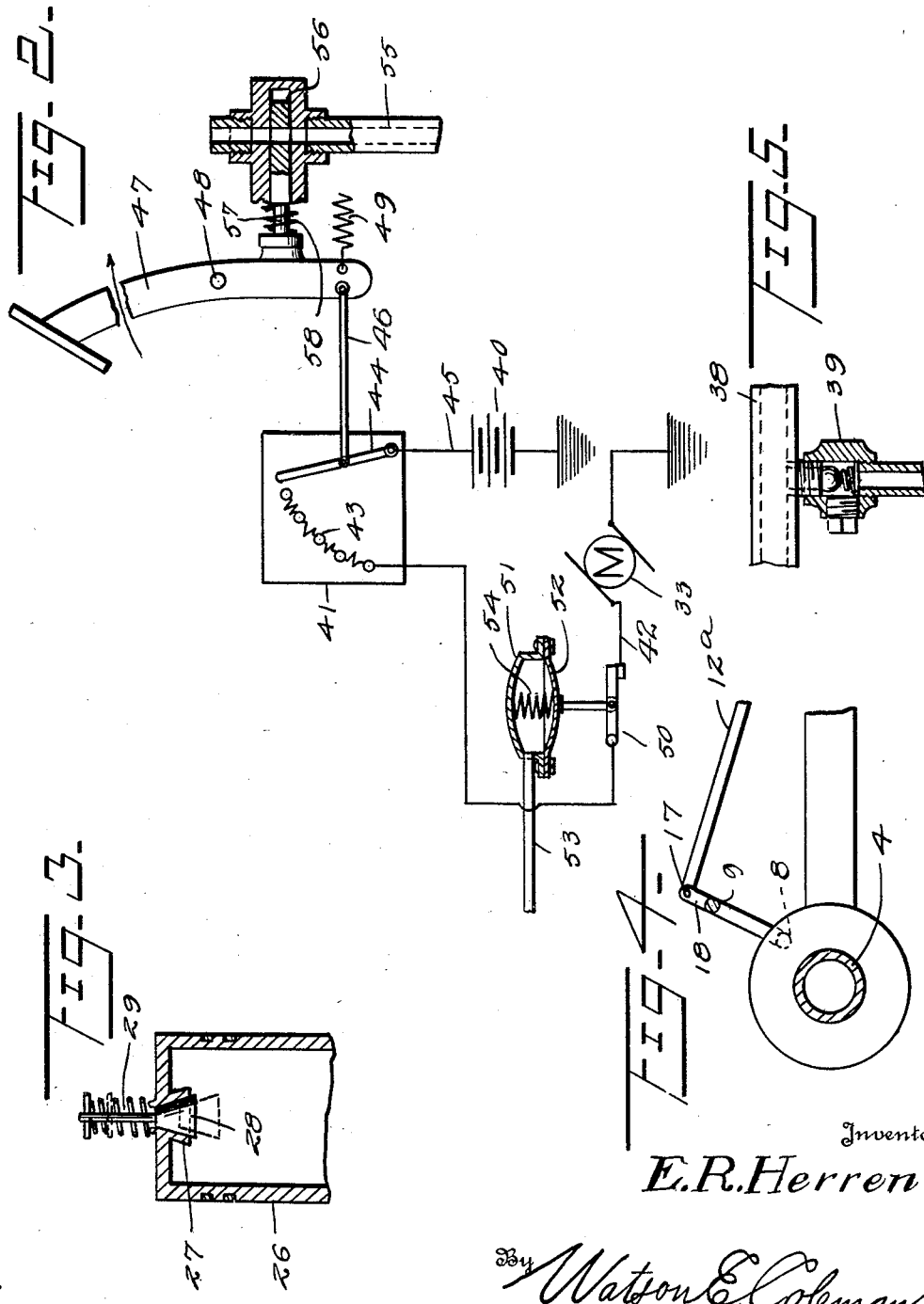

Patented May 3, 1932

1,856,635

UNITED STATES PATENT OFFICE

EARL R. HERREN, OF LORAIN, OHIO

MECHANICALLY OPERATED BRAKE

Application filed June 19, 1930. Serial No. 462,337.

This invention relates to vehicle brakes, and has for one of its objects to provide a novel vacuum brake for automobiles of all types and particularly for trucks and their trailers.

The invention has for a further object to provide a brake of the character stated which shall embody mechanical means for creating the vacuum employed to effect the application of the brake bands and wherein such means shall be adapted to be controlled by the driver of the automobile in a manner to permit the brake bands to be applied slowly or rapidly as conditions may require.

The invention has for a further object to provide a brake of the character stated wherein the mechanical means shall be adapted to effect the steady or uniform application of the brake bands whether it is operated to effect slow or rapid application of the brake bands.

The invention has for a still further object to provide a brake of the character stated which shall be simple, durable and capable of being manufactured at a comparatively low cost, and which shall be adapted to be readily installed and maintained in a high state of efficiency with comparatively little or no attention.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view partly in top plan and partly in horizontal section illustrating the application of the brake to an automobile truck;

Figure 2 is a diagrammatic view of the means for controlling the operation of the brake;

Figure 3 is a sectional view illustrating the type of piston valve employed in the vacuum pump;

Figure 4 is a sectional view taken on a plane extending vertically through the brake shaft and axle housing; and Figure 5 is a sectional view illustrating the type of check valve employed between the vacuum tank and vacuum pump.

Referring in detail to the drawings, 1 designates the chassis, 2 the rear wheels and 3 the front wheels of an automobile truck of well known construction. 4 designates the rear axle housing, 5 the brake drums and 6 the brake bands of the truck. The brake bands 6 are connected in the usual manner, as shown at 7, to a shaft 8 which is journaled, as at 8a, on the axle housing 4, and is provided at its center with a crank 9.

In accordance with my invention, a brake cylinder 10 is secured to the chassis 1 forwardly of and in longitudinal alinement with the crank 9. The brake cylinder 10 is provided at its rear side with a flexible head or diaphragm 11 to which is connected a rod 12. The diaphragm 11 is provided at its inner and outer sides with washers 13 and 14 through which the rod 12 extends. The rod 12 is screw threadedly engaged with the washers 13 and 14, and is held against accidental turning movement with respect thereto by nuts 15 and 16. A link 12a which is connected to the rod 12 is connected to the crank 9 by a pin 17. The cylinder 10 and diaphragm 11 are of similar formation and are provided with outer flanges 10a and 11a to permit them to be secured together by bolts 19, packing 20 being arranged between the flanges to render the connection between the cylinder and diaphragm air-proof.

A vacuum pump 21 is mounted upon the chassis 1 at one side of the cylinder 10, and comprises a cylinder block 22, a head 23 and a crank case 24. The block 22 has two cylinders 25 in which are reciprocably mounted pistons 26. The pistons 26 are provided in their heads with inwardly facing conical valve seats 27, and associated with said seats are conical valves 28 which are yieldingly retained seated by springs 29. The valves 28 remain seated during the inner strokes and unseat during the outer strokes of the piston 26.

The pistons 26 are connected by rods 30 to a crank shaft 31 which is journaled in bearings 32 carried by the block 22. The crank case 24 is adapted to contain lubricant for the bearings 32 and for the connections between the rods 30 and the pistons 26 and shaft 31. The vacuum pump 21 is operated through the medium of an electric motor 33 which is mounted in a casing 34 fixed to the block 22 and crank case 24. The armature shaft of the motor 33 is coupled directly to the crank shaft 31 as shown at 35.

A vacuum tank 36 is mounted upon the chassis 1 between the cylinder 10 and vacuum pump 21. One end of the tank 36 is connected to the cylinder 10 by a pipe 37, and the other end of the tank is connected by a pipe 38 and check valves 39 to the cylinders 25. The check valves 39 seat outwardly to permit the operations of the pistons 26 to create a vacuum in the cylinder 10 and tank 36.

When a vacuum is created in the cylinder 10, the diaphragm 11 is collapsed or moved forwardly with respect to the cylinder by atmospheric pressure, and the collapsing or movement of the diaphragm results in the application of the brake bands 6. When the vacuum in the cylinder 10 is broken, the diaphragm 11 returns to its original condition or moves rearwardly, and the restoration of the diaphragm to its original condition or movement thereof results in the release of the brake bands 6 which are restored to their normal inactive position in the usual manner by springs, not shown.

The motor 33 is supplied with current from the storage battery 40 of the automobile, and the supply of current thereto is controlled by a rheostat 41. One side of the battery 40 and one of the brushes of the motor 33 are grounded to the chassis 1. The other brush of the motor 33 is connected by a conductor 42 to the resistance element 43 of the rheostat 41, and the blade 44 of the rheostat is connected by a conductor 45 to the other side of the battery 40. The rheostat 41 is of well known construction, and the blade 44 thereof is connected by a link 46 to the lower end of a pedal lever 47 which is pivoted intermediate its ends, as at 48, to the chassis 1. A spring 49, which is secured at one end to the chassis 1 and at the other end to the lower end of the lever 47, serves to normally hold the blade 44 in circuit breaking position. The lever 47 provides means through the medium of which the driver of the automobile may move the blade 44 into circuit closing position when it is desired to effect the application of the brake bands 6. The rapidity of the application of the brake bands 6 will depend upon the distance through which the blade 44 is moved, as will be understood.

A normally closed pressure actuated switch 50 is interposed in the conductor 42. The means for actuating this switch comprises a chamber 51 provided with a flexible diaphragm 52 and connected to the cylinder 10 by a pipe 53. A spring 54 arranged in the chamber 51 and bearing against the diaphragm 52 serves to maintain the switch 50 normally closed. A vacuum is simultaneously created in the cylinder 10 and chamber 51, and when sufficient air has been exhausted from these parts to permit the application of the brake bands, the diaphragm 52 is moved inwardly. This movement of the diaphragm 52 results in the opening of the switch 50 and the consequent stopping of the motor 33 and pump 21. The stopping of the pump 21 does not permit the release of the brake bands 6, and they will not be released until the vacuum in the cylinder 10 and chamber 51 is broken.

To permit the vacuum to be broken and the consequent releasing of the brake bands 6, a release pipe 55 is connected at one end to the cylinder 10 and is provided at its other end with a valve 56 which controls communication of the pipe with the atmosphere. The valve 56 has its stem 57 arranged in contact with the front side of the lever 47 so as to permit it to be normally held opened by the spring 49. A spring 58 functions to close the valve 56 during the first phase of the movement of the lever 47 when the latter is forwardly depressed or swung in the direction indicated by the arrow of Figure 2, the remaining phase of this movement of the lever serving to move the blade 44 into circuit closing position. It will thus be seen that communication between the cylinder 10 and the atmosphere will be cut off immediately prior to the operation of the pump 21 to create a vacuum in the cylinder, the creation of the vacuum resulting in the application of the brake bands 6.

It should be understood from the foregoing description, taken in connection with the accompanying drawings, that the spring 49 normally supports the lever 47 in upright position, and that when the lever is in this position, the rheostat blade 44 is in motor circuit breaking position and the valve 56 is opened. When the parts are in these positions, the vacuum pump 21 is at rest, the cylinder 10 is in communication with the atmosphere, and the brake bands 6 are released. To apply the brake bands 6, it is only necessary to depress the lever 47 in a forward direction. During the first phase of the movement of the lever 47, the valve 56 is released for closing by its spring 58, and during the remaining phase of this movement of the lever, the rheostat blade 44 is moved into motor circuit closing position. As the pump 21 is now operating and as the valve 56 is closed, a vacuum is created in the tank 36, cylinder 10, and chamber 51, the creation of the vacuum permitting the diaphragm 11 to be moved by atmospheric pressure in a direction to apply the brake bands 6. On the full application of the brake bands 6, a sufficient vacuum will be created in the chamber 51 to permit the opening of the switch 50. The stopping of the pump 21, as the result of the opening of the switch 50, will not release the brake bands 6 which will remain applied until the lever 47 is released.

Upon being released, the lever 47 is swung in the opposite direction or rearwardly by the spring 49, and during the first phase of this movement of the lever, the rheostat blade 44 is moved into circuit breaking position and during the final phase of this movement of the lever, the valve 56 is opened by its spring 57, the opening of the valve breaking the vacuum in the cylinder 10, tank 36 and chamber 51 to permit the brake bands 6 to be moved into released position by their springs and to permit the closing of the switch 50 by its spring 54. The rapidity of the application of the brake bands 6 depends upon the rapidity with which the lever 47 is depressed, it being thus apparent that the brake bands may be applied as slowly or quickly as conditions may require. The tank 36 stabilizes the creation of the vacuum in the cylinder 10, and this effects the application of the brake bands 6 in a steady or uniform manner.

I claim:—

1. A vehicle brake, comprising breaking elements, a cylinder having a flexible head connected to said elements, a vacuum pump connected to the cylinder, a normally idle motor for the pump, a normally opened release valve connected to the cylinder, and means by which the motor may be operated and the valve closed.

2. A vehicle brake, comprising breaking elements, a cylinder having a flexible head connected to said elements, a vacuum stabilizing tank connected to the cylinder, a vacuum pump connected to the tank, a normally idle motor for the pump, a normally opened release valve connected to the cylinder, and means for starting the motor and closing the valve.

3. A vehicle brake, comprising breaking elements, a cylinder having a flexible head connected to said elements, a vacuum pump connected to the cylinder, an electric motor for the pump, a source of current connected to the motor, a switch in said connection, a normally opened release valve connected to the cylinder, and means normally holding the switch opened and adapted to be operated to close the switch and valve.

4. A vehicle brake, comprising breaking elements, a cylinder having a flexible head connected to said elements, a vacuum pump connected to the cylinder, an electric motor for the pump, a source of current connected to the motor, a rheostat having a movable blade and arranged in said connection, a pivoted lever connected to the rheostat, a spring acting through the lever to hold the blade in circuit breaking position, and a normally opened release valve connected to the cylinder and bearing against the lever, the lever being adapted to be rocked to move the blade into circuit closing position and to close the valve.

5. A vehicle brake, comprising breaking elements, a cylinder having a flexible head connected to said elements, a vacuum pump connected to the cylinder, an electric motor for the pump, a source of current connected to the motor, a normally opened switch in said connection, a normally opened release valve connected to the cylinder, means by which the switch and valve may be closed, and a normally closed pressure actuated switch in said connection and connected to the cylinder.

6. A vehicle brake, comprising breaking elements, a cylinder having a flexible head connected to said elements, a vacuum stabilizing tank connected to the cylinder, a vacuum pump connected to the tank, an electric motor for the pump, a source of current connected to the motor, a rheostat having a blade and arranged in said connection, a pivoted lever connected to the blade, a spring acting through the lever to normally hold the blade in circuit breaking position, a normally opened release valve connected to the cylinder and bearing against the lever, the lever being adapted to be operated to move the blade into circuit closing position and to close the valve, and a normally closed pressure operated switch in said connection and connected to the cylinder, said last switch being adapted to be opened on the creation of a predetermined vacuum in the cylinder.

In testimony whereof I hereunto affix my signature.

EARL R. HERREN.